United States Patent
Ries et al.

(10) Patent No.: US 7,404,024 B2
(45) Date of Patent: Jul. 22, 2008

(54) METHOD FOR ARBITRATING ACCESS TO A SHARED RESOURCE

(75) Inventors: Gilles Ries, Herbeys (FR); Jean-François Agaesse, Montferrat (FR)

(73) Assignee: STMicroelectronics S.A., Montrouge (FR)

( * ) Notice: Subject to any disclaimer, the term of this patent is extended or adjusted under 35 U.S.C. 154(b) by 251 days.

(21) Appl. No.: 10/966,623

(22) Filed: Oct. 14, 2004

(65) Prior Publication Data
US 2005/0080967 A1 Apr. 14, 2005

(30) Foreign Application Priority Data
Oct. 14, 2003 (FR) .................................. 03 11973

(51) Int. Cl.
G06F 12/00 (2006.01)
(52) U.S. Cl. .................. 710/244; 710/107; 710/116; 710/240
(58) Field of Classification Search .............. 710/116, 710/123, 240, 107, 244; 713/400, 500, 502
See application file for complete search history.

(56) References Cited

U.S. PATENT DOCUMENTS

| | | | |
|---|---|---|---|
| 757,285 A | 4/1904 | Duchemin | |
| 1,593,408 A | 2/1926 | Honigbaum | |
| 3,738,076 A | 6/1973 | Kessler | |
| 4,642,758 A * | 2/1987 | Teng | 707/10 |
| 5,010,476 A * | 4/1991 | Davis | 711/147 |
| 5,150,555 A | 9/1992 | Wood | |
| 5,297,383 A | 3/1994 | Mackay | |
| 5,339,608 A | 8/1994 | Hollis et al. | |
| 5,392,033 A | 2/1995 | Oman et al. | 340/825.5 |
| 5,392,579 A | 2/1995 | Champagne | |
| 5,471,588 A * | 11/1995 | Nimishakavi et al. | 710/113 |
| 5,537,791 A | 7/1996 | Champagne | |
| 5,564,245 A | 10/1996 | Rademacher | |
| 6,026,459 A * | 2/2000 | Huppenthal | 710/116 |
| 6,138,197 A | 10/2000 | Cheng | 710/117 |
| 6,389,497 B1 | 5/2002 | Koslawsky et al. | 710/242 |
| 6,925,520 B2 * | 8/2005 | Ma et al. | 710/317 |
| 7,013,357 B2 * | 3/2006 | Murdock et al. | 710/240 |
| 7,051,133 B2 * | 5/2006 | Takata | 710/111 |
| 7,062,582 B1 * | 6/2006 | Chowdhuri | 710/116 |
| 7,065,595 B2 * | 6/2006 | Drerup et al. | 710/117 |
| 2002/0143847 A1 * | 10/2002 | Smith | 709/103 |
| 2004/0216112 A1 * | 10/2004 | Accapadi et al. | 718/103 |

OTHER PUBLICATIONS

Singatwaria et al. Timer based Burst mode Protocol for High Speed Networks. IEEE. 1996.*

(Continued)

*Primary Examiner*—Mark Rinehart
*Assistant Examiner*—Matthew D Spittle
(74) *Attorney, Agent, or Firm*—Lisa K. Jorgenson; Robert Iannucci; Seed IP Law Group PLLC

(57) ABSTRACT

A method for arbitrating access to a resource shared by several electronic elements. Each element is allocated a first counting value and a first penalty, the first counting value is decremented in synchronization with a clock signal, and is incremented by a value equal to the first penalty every time the element is selected for an access cycle. When several elements are simultaneously waiting to access the shared resource, an element is selected to access the resource if its first counting value is lower than or equal to a determined threshold, and is lower than the first counting values of the other elements having sent an access request.

27 Claims, 10 Drawing Sheets

OTHER PUBLICATIONS

Widiger et al. An Integrated Hardware Solution for MAC Address Translation, MPLS, and Traffic Management in Access Networks. IEEE. 2006.*

Al-Sukhni et al. Improved Stride Prefetching using Extrinsic Stream Characteristics. IEEE. 2006.*

* cited by examiner

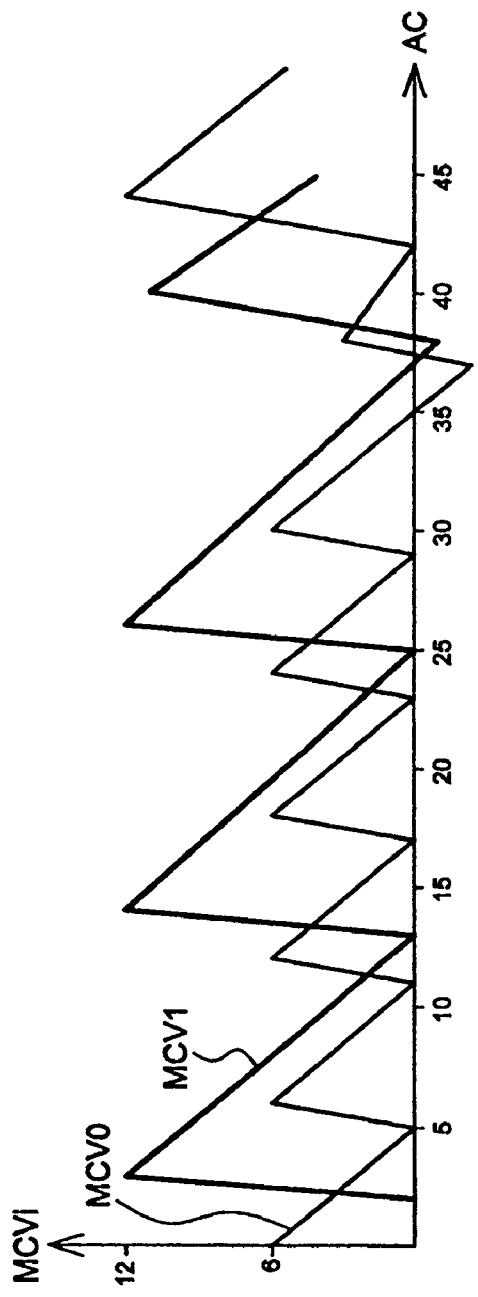
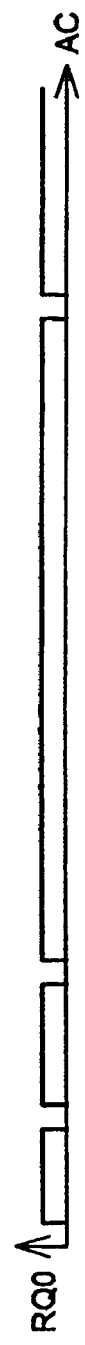
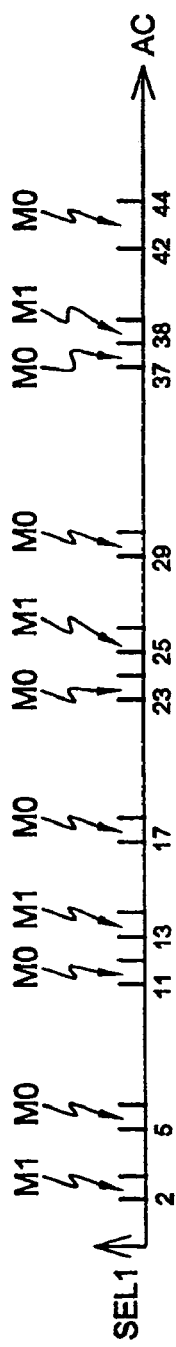
FIG. 3A
FIG. 3B
FIG. 3C
FIG. 3D

METHOD FOR ARBITRATING ACCESS TO A SHARED RESOURCE

BACKGROUND OF THE INVENTION

1. Field of the Invention

The present invention relates to a method and a device for arbitrating access to a resource shared by several elements.

2. Description of the Related Art

FIG. 1 schematically represents an example of a device for arbitrating access to a shared resource. A group of master circuits M0, M1, ... Mi, ... Mn are linked to a shared resource through a multiplexer circuit BMUX. The shared resource here comprises a bus BSH and at least one peripheral circuit PPH linked to this bus, for example a data and/or instruction memory forming a slave circuit. The group of master circuits comprises for example microprocessors, a DSP processor, co-processors, a DMA circuit (direct memory access circuit), an embedded video camera . . . . Such a combination of circuits sharing a common resource is frequent in integrated circuits for new generation mobile telephones.

Accesses to the memory PPH are arbitrated by an arbitrating device ACT1 that receives access requests R0, R1, ... Ri, ... Rn supplied by each of the master circuits and which supplies a selection signal SEL to a control input of the circuit BMUX, by applying a determined arbitration rule. The requests Ri and the cycles for accessing the shared resource are clocked by a clock signal common to the master circuits, which enables the accesses to the shared resource to be synchronized.

To date, the known arbitration methods are not very satisfactory or adapted to the increasingly complex combinations of master circuits having different roles and different needs in terms of access to the shared resource, certain circuits needing to access the resource regularly but in a way that only represents a small part of the access possibilities offered by the resource, other circuits having irregular access needs that can sometimes be significant at determined periods, and insignificant outside these periods.

Thus, high data rate master circuits can be distinguished that are relatively insensitive to the latency time (waiting time between the accesses to the shared memory). These are for example microprocessors, processors or DSPs (digital signal processor) that need to access the shared memory often but can wait for the memory to be available to perform the operations requiring such an access.

Master circuits can also be distinguished which have a low data rate but are sensitive to the latency time, i.e., they have difficulty delaying the access to the shared memory. These are particularly circuits having a small buffer memory that must regularly exchange data with the shared memory, such as DMA circuits (memory access management circuits), particularly when these circuits supply data to a communication peripheral (USB port, etc.). A video camera must also transfer several images per second into the shared memory, when it is used, then it practically no longer requires access to the memory between two transfers of images. Such a video camera must therefore be able to access the shared memory regularly, so as not to lose data, since its buffer memories can only store a fraction of image (some tens or hundreds of image dots).

High data rate master circuits can also be distinguished that require a minimal and almost immediate access to the shared memory. These are for example microprocessors or DSPs in interrupt mode, that must transfer or read data (data and/or instructions) in the memory at any instant, according to external events causing interrupts, without obeying a determined law of recurrence. Such circuits therefore have a great need to be able to access the peripheral memory "instantly", i.e., waiting as little as possible.

Finally, master circuits can be distinguished that have a low and consistent data rate but which operate temporarily outside their usual specifications. Thus, a DMA circuit may sometimes need to access the memory almost instantly (short latency time), for example upon the transfer of a considerable amount of data, and sometimes have a considerable need to access the memory for high data rate transfers while being relatively insensitive to the latency time. A video camera, outside its cyclical data rate corresponding to a transfer of images, may sometimes require a high data rate.

When all is said and done, a same master circuit can come under several of the above categories, and have different access needs at different instants.

Now, the classical arbitration methods such as fixed and hierarchized priority arbitration (priority by ascending or descending rank) or rotating priority arbitration ("Round Robin" method) do not optimize the sharing of a resource when there is a plurality of master circuits of the aforementioned type, each having different access needs likely to vary in time.

BRIEF SUMMARY OF THE INVENTION

One embodiment of the present invention provides an arbitration method and device that are very flexible to use and configurable according to the "profiles" of the elements sharing the shared resource, in terms of access needs.

One embodiment of the present invention provides a first arbitration mechanism that guarantees each element a minimum access to the shared resource at regular time intervals, according to a minimum sharing rule that can be configured as required.

One embodiment of the present invention provides a second arbitration mechanism that guarantees each element an instant access to the shared resource without imposing a determined time interval between two accesses, according to a proportional sharing rule that can be configured as required.

More particularly, one embodiment of the present invention provides a method for arbitrating access to a resource shared by several electronic elements and accessible according to access cycles clocked by a clock signal, wherein each element wishing to access the shared resource sends an access request, a method in which: each element is allocated a first counting value and a first penalty, the first counting value of each element is decremented, or incremented, in synchronization with the clock signal, the first counting value of each element is incremented, or respectively decremented, by a value equal to the first penalty, every time the element is selected for an access cycle, and when several elements are simultaneously waiting to access the shared resource, an element is selected to access the resource if its first counting value is lower than or equal, or respectively higher than or equal, to a determined threshold, and if its first counting value is lower, or respectively higher, than the first counting values of the other elements having sent an access request.

According to one embodiment, an element is selected whatever its first counting value, if it is the only element requesting access to the shared resource.

According to one embodiment, when two elements likely to be selected have the same first counting value, the element to be selected is designated by applying a predetermined selection rule.

According to one embodiment, the access requests may concern several successive access cycles and, when an element having sent an access request concerning several access cycles is selected, access to the shared resource is granted to the element for the number of access cycles requested, even if, after the first access cycle of the element, the element can no longer be selected by virtue of its first counting value.

According to one embodiment, the first counting value of an element is inhibited when the element does not send any access request for a determined number of access cycles.

According to one embodiment, each element is allocated a second counting value and a second penalty, the second counting value of each element is incremented, or decremented, by a value equal to the second penalty, every time the element is selected, and when several elements are simultaneously waiting to access the shared resource, if no element can be selected by virtue of its first counting value, the element selected is the one having the second counting value that is lower, or respectively higher, than the second counting values of the other elements having sent an access request.

According to one embodiment, the second counting value of an element is maintained at a determined value when the element does not send any access request for a determined number of access cycles.

According to one embodiment, the second counting value of an element that has not sent any access request for a determined number of access cycles, is maintained at a value equal to the lowest second counting value of the elements sending access requests.

According to one embodiment, the first counting value of each element is incremented, or respectively decremented, by a value equal to the first penalty, every time the element is selected by virtue of its second counting value, and reciprocally the second counting value of each element is also incremented, or respectively decremented, by a value equal to the second penalty, every time the element is selected by virtue of its first counting value.

According to one embodiment, the access requests may concern several successive access cycles and, when an element having sent an access request concerning several access cycles is selected, access to the shared resource is granted to the element for the number of access cycles requested, even if, after the first access cycle of the element, the element can no longer be selected by virtue of its first and second counting values.

According to one embodiment, the method is applied to a device wherein the shared resource is a data bus linked to one or several peripheral circuits through an access multiplexer circuit, the electronic elements being master circuits relative to the peripheral circuits.

According to one embodiment, the access multiplexer circuit supplies control signals designating the master circuit selected at each access cycle, and the control signals are used to identify the counting values that must be decremented or incremented at each access to the data bus.

Some embodiments of the present invention also relate to a device for arbitrating access to a resource shared by several electronic elements, the shared resource being accessible according to access cycles clocked by a clock signal, each element wishing to access the shared resource having to send an access request, the device comprising first registers for storing, for each element, a first penalty individually allocated to each element, first counters for individually allocating to each element a first counting value, and for decrementing, or incrementing, the first counting value in synchronization with the clock signal, and incrementing, or respectively decrementing, the first counting value by a value equal to the first penalty, every time the corresponding element is selected for an access cycle, and a first comparison circuit for supplying, when several elements are simultaneously waiting to access the shared resource, a first selection signal designating an element the first counting value of which is lower than or equal, or respectively higher than or equal, to a determined threshold, and the first counting value of which is lower, or respectively higher, than the first counting values of the other elements having sent an access request.

According to one embodiment, the device comprises means for selecting an element that is the only element requesting access to the shared resource, whatever the first counting value of the element is.

According to one embodiment, when two elements have the same first counting value, the first comparison circuit is arranged for selecting one of these elements according to a predetermined selection rule.

According to one embodiment, the device comprises a circuit for managing the first counters to inhibit the first counting value of an element that has not sent any access request for a determined number of access cycles.

According to one embodiment, the device further comprises second registers for storing, for each element, a second penalty individually allocated to each element, second counters for individually allocating to each element a second counting value, and for incrementing, or decrementing, the second counting value by a value equal to the second penalty, every time the corresponding element is selected for an access cycle, and a second comparison circuit for supplying, when several elements are simultaneously waiting to access the shared resource, a second selection signal designating an element the second counting value of which is lower, or respectively higher, than the second counting values of the other elements having sent an access request.

According to one embodiment, the first and second selection signals are applied to a multiplexer circuit the output of which supplies a general selection signal equal to the second selection signal when the first comparison circuit does not find any element to select, otherwise equal to the first selection signal.

According to one embodiment, the first counting value of each element is incremented, or respectively decremented, by a value equal to the first penalty, every time the element is selected by virtue of its second counting value, and reciprocally the second counting value of each element is incremented, or respectively decremented, by a value equal to the second penalty every time the element is selected by virtue of its first counting value.

According to one embodiment, the device comprises a circuit for managing the second counters to maintain the second counting value of an element at a determined value when the element does not send any access request for a determined number of access cycles.

According to one embodiment, the circuit for managing the second counters maintains the second counting value of an element that has not sent any access request for a determined number of access cycles, at a value equal to the lowest second counting value of the elements sending access requests.

According to one embodiment, the device comprises a circuit for managing access requests in bursts that is arranged for maintaining the selection of a selected element, even if, after the first access cycle granted to the element, this element cannot be selected by virtue of its first or second counting value.

According to one embodiment, the device comprises an access multiplexer circuit for linking a selected element to the shared resource at each access cycle.

According to one embodiment, the access multiplexer circuit supplies control signals designating the master circuit selected at each access cycle, the control signals being applied to the counters as load signals, for loading the first or the second penalty.

According to one embodiment, the shared resource is a bus linked to one or several peripheral circuits, the electronic elements being master circuits relative to the peripheral circuits.

BRIEF DESCRIPTION OF THE SEVERAL VIEWS OF THE DRAWINGS

These and other features and advantages of the present invention will be explained in greater detail in the following description of an arbitration method according to the present invention and of an example of an embodiment of an arbitration device implementing this method, given in relation with, but not limited to the following figures:

FIGS. 3A to 3D are timing diagrams showing an arbitration sequence according to a first arbitration mechanism according to one embodiment of the present invention.

DETAILED DESCRIPTION OF THE INVENTION

Figure 1:
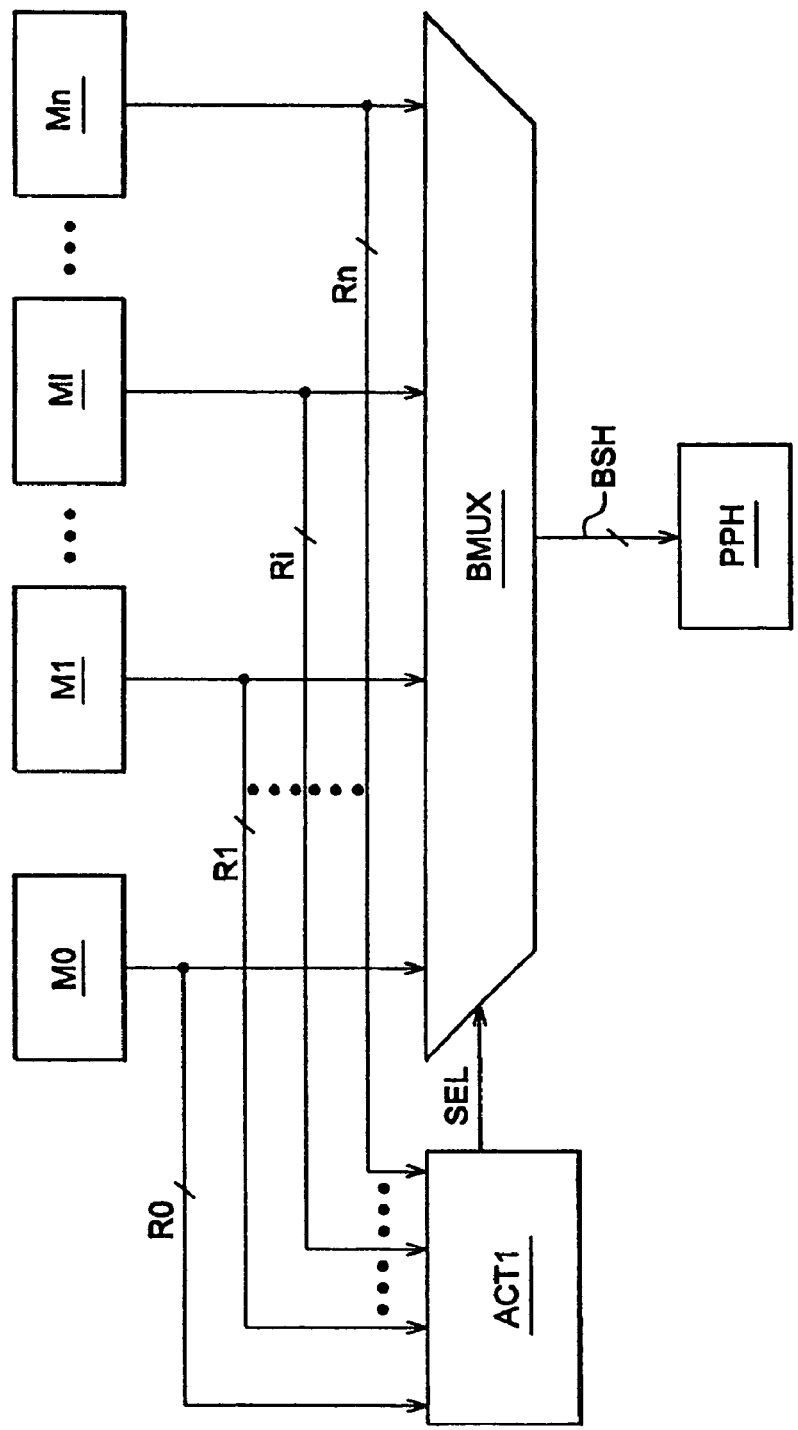
FIG. 1 described above represents a classical device for arbitrating access to a shared resource.
Figure 2:
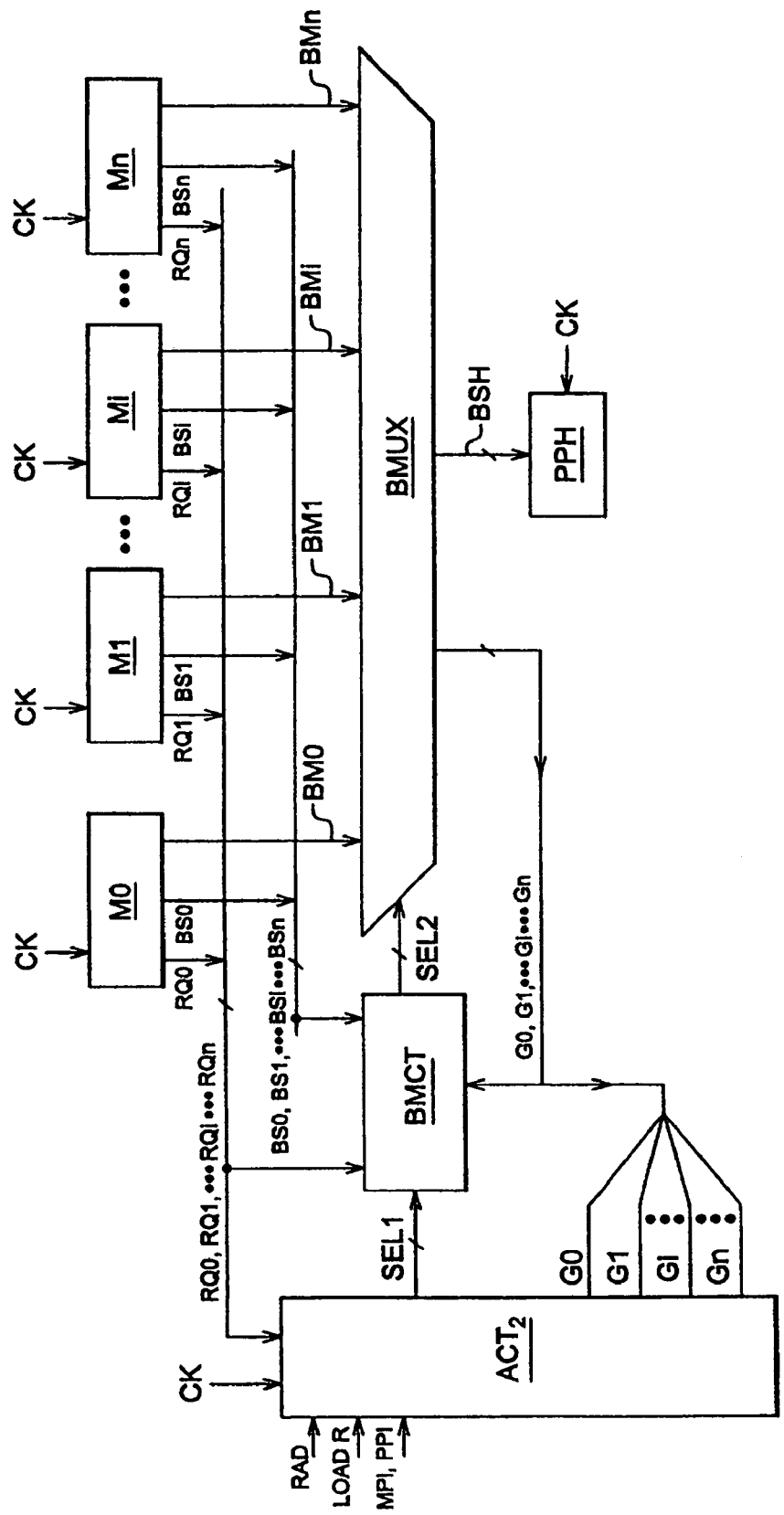
FIG. 2 represents a device for arbitrating access to a shared resource, comprising an arbitration circuit according to one embodiment of the present invention represented in block form.

Example of Embodiment of an Arbitration Device According to the Present Invention In FIG. 2, a resource BSH, PPH is shared by elements Mi (M0, M1, . . . Mn). The resource comprises a bus BSH linked to a peripheral circuit PPH. The elements Mi are master circuits relative to the peripheral circuit. The peripheral circuit is for example a read/write-accessible memory.

Out of concern to simplify the terminology, it will be considered in the following that the bus BSH is the shared resource. Indeed, if several peripherals are connected to the bus, each master circuit must first access the bus to access one of the peripherals. Conceptually speaking, the bus is therefore the first resource that the master circuits must access.

Access to the bus is controlled by an arbitration device comprising a multiplexer circuit BMUX, a circuit for managing accesses in bursts BMCT ("Burst Management Circuit"), and an arbitration circuit ACT2 according to the present invention.

The multiplexer circuit BMUX has n+1 inputs connected to the master circuits Mi and an output connected to the bus BSH. Each master circuit Mi is linked to an input of the circuit BMUX through a bus BMi (BM0, BM1, . . . BMn). The buses BMi and the bus BSH comprise for example N data wires and M address wires in parallel, and possibly various other control wires required for the data exchanges between the master circuits and the peripheral circuit. The data are therefore transferred between the master circuits and the peripheral circuit by words of N+M bits in parallel, via the circuit BMUX.

Each master circuit Mi supplies a request signal RQi (RQ1 to RQn) coded on one bit, and a burst signal BSi (BS0 to BSn) coded on several bits. The request signal RQi is taken to 1 when the master circuit Mi wishes to access the bus, while the burst signal BSi indicates the number Bi of words that the master circuit wishes, as necessary, to send one after the other. The signal BSi is for example coded on 4 bits and is between 0 and 15. The value "0" is the default value and means that an access is requested for one access cycle only (Bi=1). The maximum value BSi=15 corresponds to an access request for 16 successive cycles (Bi=16).

The circuit ACT2 supplies a selection signal SEL1 that is applied to an input of the circuit BMCT. The latter supplies a selection signal SEL2 that is applied to a control input of the circuit BMUX. The circuit BMUX links the master circuit Mi that is designated by the selection signal SEL2 to the bus BSH.

The circuit ACT2 receives the request signals RQi supplied by the master circuits Mi, while the circuit BMCT receives both the request signals RQi and the burst signals BSi. When a master circuit requests access to the bus BSH for a single access cycle (BSi=0, i.e., Bi=1), the circuit BMCT is transparent in relation to the circuit ACT2. The circuit ACT2 supplies the signal SEL1 for selecting the master circuit and the signal SEL2 copies the signal SEL1. When a master circuit requests access to the bus BSH for several access cycles (BSi≠0), and when this master circuit is selected by the circuit ACT2, the circuit BMCT is transparent for the first access cycle then maintains the signal SEL2 on the initial value of the signal SEL1 until the burst access is finished, even if the signal SEL1 has changed value in the meantime.

The circuit BMUX also supplies control signals Gi (G0 to Gn) indicating, at each access cycle, the master circuit Mi to which access to the bus is granted. For example, the signal G1 is on 1 when the master circuit M1 accesses the bus, while the other signals G0, G2, . . . Gn are on 0. These signals are managed automatically by the circuit BMUX according to the selection signal SEL2 received at its control input.

The synchronization between these various elements is performed by a common clock signal CK. An access cycle to the bus lasts for n clock cycles, for example two clock cycles.

The circuits BMUX and BMCT are classical elements per se found in standard components, for example in the circuit marketed by ARM® under the reference BUS-MATRIX. However, in the component BUS-MATRIX, the selection signal SEL1 is supplied by a classical arbitration circuit integrated into the component, which only offers a fixed priority arbitration.

This classical arbitration circuit is replaced by the circuit ACT2 according to one embodiment of the present invention. Such a replacement involves deactivating the classical arbitration circuit, and transplanting the circuit ACT2 to a by-pass input of the classical arbitration circuit.

The arbitration method according to one embodiment of the present invention will now be described, followed by a description of an example of an embodiment of the arbitration circuit ACT2.

General Features of One Arbitration Method According to the Present Invention

According to the present invention, the "bandwidth" BW of the shared resource, here the bus BSH, is the maximum number of accesses to the bus per unit of time, for example per second. This bandwidth BW is distributed to the master circuits according to two different arbitration mechanisms, respectively called "minimum access arbitration" and "proportional access arbitration", whereby a "minimum bandwidth" MBW and a "proportional bandwidth" PBW can appear.

Minimum Bandwidth

The minimum bandwidth MBW represents a minimum number of accesses per unit of time that is guaranteed to all the master circuits. This minimum bandwidth represents all or part of the total bandwidth BW of the bus, and is distributed between each master circuit according to the "profile" of each one, i.e., its need to access the bus at regular time intervals. Thus, an individual minimum bandwidth MBWi is defined for each master circuit Mi, which represents the number of accesses per unit of time that is guaranteed to each master circuit, the minimum bandwidth MBWi allocated to each master circuit being a fraction of the global minimum bandwidth MBW.

More particularly, each master circuit is allocated a minimum access counting value MCVi, and a minimum access penalty MPi. The minimum access counting value MCVi of each master circuit Mi is decremented by a number D at each clock cycle, in an equal manner for each master circuit, and is incremented by a value equal to the penalty MPi when a master circuit obtains an access cycle to the bus.

When several master circuits Mi attempt to access the bus simultaneously, the access is granted to the circuit Mi having the counting value MCVi that is:

lower than or equal to a determined threshold THR, for example the threshold 0, starting from which the master circuit is considered to have high priority, and lower than the counting values of the other circuits wishing to access the bus.

If two master circuits have high priority, it is the one having the lowest counting value (the most negative, the threshold THR here being 0) that will be the first one selected.

Thus, each master circuit Mi has, on average, the possibility of accessing the bus every C clock cycles, with C equal to the minimum access penalty MCVi allocated to the master circuit.

If a master circuit Mi requests a burst access for Bi access cycles, its counting value MCVi is incremented by the minimum access penalty MPi at each access cycle of the burst access. At the end of the burst access, the counting value MCVi of the master circuit is thus increased by Bi times the minimum access penalty:

$$MCVi = MCVi + Bi*MPi \quad (1)$$

If two master circuits have, at a given instant, the same counting value, the arbitration is performed by applying a classical-type predetermined arbitration rule, for example a fixed priority or rotating priority arbitration rule.

By designating by MBWi % the individual minimum bandwidth of a master circuit Mi expressed in relative value (percentage taken to 1), it can be shown that:

$$MBWi\% = (D*n/MPi) \quad (2)$$

D being the decrement of the counting value at each clock cycle, and n the number of clock cycles that an access cycle comprises.

The relative minimum bandwidth MBW % granted to all the master circuits is thus equal to:

$$MBW\% = \left(\sum_{i=0}^{i=n} D*n/MPi\right) \quad (3)$$

This global minimum bandwidth expressed in relative value, must preferably be lower than 1 so that there is bandwidth remaining to be distributed, for example by means of the proportional access arbitration mechanism described below. However, the access to the bus can also be entirely managed by the minimum access arbitration mechanism.

In the following, D will be considered to always be equal to 1, each minimum access counting value thus being decremented by 1 at each clock cycle.

As an example, it is assumed that the shared bus BSH is clocked by a clock signal at 70 MHz, and that an access cycle to the bus lasts for two clock cycles (n=2). It comes that the bus is capable of supplying 35 MA/s ("Mega Accesses per second") i.e., here $35*10^6$ accesses per second, this value representing the total bandwidth BW of the bus.

It is then assumed that only the master circuits M0 and M1 are active, that the circuit M0 needs 5 MA/s to operate correctly, and that the circuit M1 needs 7 MA/s. With a clock frequency of 70 MHz and with D=1, the master circuit M0 will therefore need to access the bus every 14 clock cycles (70/5) and the master circuit M1 will need to access the bus every 10 clock cycles (70/7). In this case, the following minimum access penalties MP0, MP1 are allocated to the master circuits M0, M1:

$$MP0 = 70/5 = 14 \quad (4)$$

$$MP1 = 70/7 = 10 \quad (5)$$

The minimum bandwidth, expressed in relative value (relative minimum bandwidth) is here equal to:

$$MBW\% = 2/7 + 2/5 = 0.34 \quad (6)$$

i.e., 34% of the total bandwidth BW, 20% of which is allocated to the circuit M1 and 14% allocated to the circuit M0. The two master circuits thus receive in total a minimum bandwidth of 12 MA/s. There are 23 MA/s of bandwidth remaining to be distributed as proportional bandwidth, in a manner described below.

FIGS. 3A to 3D show a minimum access arbitration sequence, the horizontal axis of the figures representing access cycles AC. FIG. 3A represents the counting values MCV0, MCV1 of the master circuits M0, M1. FIG. 3B represents the request signal RQ0 supplied by the circuit M0 and FIG. 3C represents the request signal RQ1 supplied by the circuit M1 these signals being set to 1 when an access to the bus is requested. FIG. 3D represents the cycles during which the circuits M0, M1 have access to the bus (signal SEL1).

In FIG. 3A, the minimum access penalty allocated to the circuit M0 is equal to 6 and the minimum access penalty allocated to the circuit M1 is equal to 12. The high priority threshold THR is here equal to 0, as proposed above.

Upon each access to the bus, the counting value MCV0 of the circuit M0 is incremented by 6, and the counting value MCV1 of the circuit M1 is incremented by 12, each circuit obtaining, in principle, access to the bus when its counting value reaches the threshold 0. However, at the cycle 35 the counting value MCV0 of the circuit M0 continues to be decremented towards the negative values. Indeed, it is assumed here that the access to the bus cannot be granted to the circuit M0 since other master circuits, having counting values lower than that of the circuit M0, have priority (these other counting values are not represented in the Figure out of concern to remain simple). Thus, the circuit M0 must wait for the cycle 37 to access the bus. At the cycle 37, the counting value MCV0 is incremented by 6 but has, after incrementation, a value lower than 6, having been incremented starting from a negative value. Thus, the circuit M0 will catch up during the next cycles, since the threshold 0 will be reached faster. Similarly, at the cycle 37, the counting value MCV1 of the circuit M1 reaches the threshold 0 but the access cannot be granted, since it is granted as a priority to the circuit M0, the counting value of which is lower. The counting value MCV1 therefore also tends towards a negative value, through to the cycle 38 at which the access is granted to the circuit M1 (see also FIG. 3D).

It will be understood that this arbitration mechanism only intervenes in the event of a collision between access requests, and it is therefore assumed, in the example in FIG. 3, that at each instant there is a plurality of other master circuits waiting to access the bus or which are accessing the bus, the counting values of which have not been represented out of concern to remain simple.

Conversely, if a master circuit is the only one requesting access to the bus, access is granted to it whatever its minimum access counting value. However, its counting value continues to be incremented at each access granted. If other master circuits then send access requests, the master circuit that has been the only one to use the bus finds itself with a very high counting value and must wait until the other master circuits have been allocated the quotas of access to the bus to which they are entitled, before it can access the bus again.

Figure 4A:
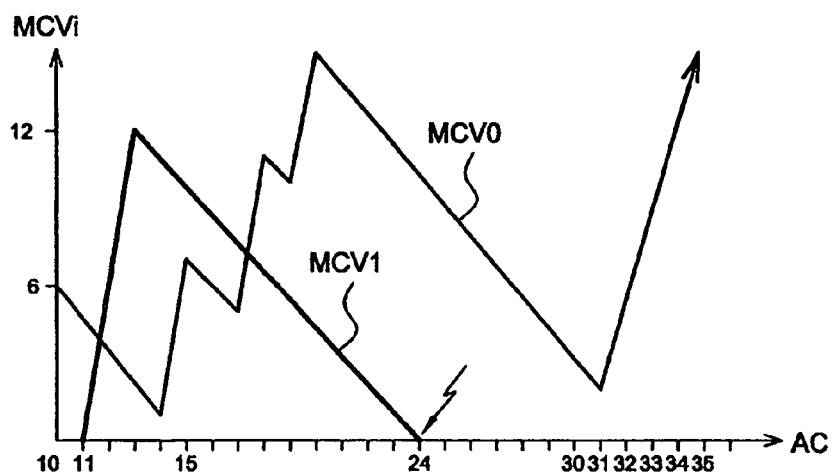
FIGS. 4A to 4C are timing diagrams showing another arbitration sequence according to the first arbitration mechanism according to one embodiment of the present invention.
Figure 4B:
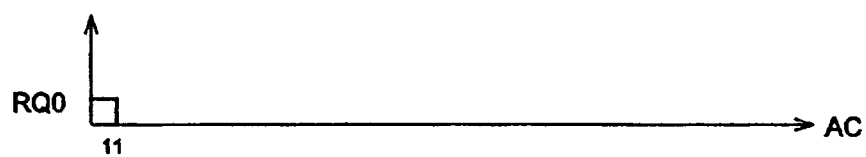
Figure 4C:

FIGS. 4A to 4C shows an example of such a case. FIG. 4A represents the counting values MCV0, MCV1 of the master circuits M0, M1 FIG. 4B represents the request signal RQ0 of the circuit M0 and FIG. 4C the request signal RQ1 of the circuit M1. The minimum access penalties of the circuits M0, M1 are always equal to 6 and to 12, respectively.

After accessing the bus at the cycle 11, the circuit M1 remains silent and no longer requests access to the bus. The circuit M0 thus enjoys the entire availability of the bus (assuming here that no other master circuit is active). Thus, the circuit M0 requests access to the bus at the cycles 13, 16, 18, and obtains it at the cycles immediately after 14, 17, 19, although its counting value MCV0 has not reached the threshold 0. With each access granted, the counting value MCV0 continues to increase. During the cycle 30 the circuit M0 sends an access request accompanied by a burst signal BS0 (BSi with i=0) different to 0, for example equal to 15, i.e., 16 successive accesses requested. Thus, starting from the cycle 31 and at each subsequent access cycle, the counting value MCV0 is incremented by 6 and tends towards high values that are outside the scale in FIG. 4A.

Preferably, a mechanism is provided for inhibiting the counting values when the master circuits do not send any request for a determined number of access cycles. This inhibiting mechanism involves for example forcing the counting value of the inactive master circuit to 0. Thus, on the example in FIG. 4A, the counting value MCV1 is maintained on 0 when it reaches the 0, since the circuit M1 has not sent any request for more than 10 access cycles. In practice, it is however preferable to choose an inactivity threshold higher than the duration elapsing between the instant at which the penalty is applied and the instant at which the high-priority threshold is reached (i.e., the duration of the "saw-tooth" in FIG. 4A). This amounts to waiting for the counting value to reach negative values before inhibiting it by taking it back to 0.

Proportional Bandwidth

According to some embodiments of the present invention, the proportional bandwidth PBW is the part of the total bandwidth of the shared resource that is distributed to the master circuits by means of the proportional access arbitration mechanism according to one embodiment of the present invention.

Like the minimum bandwidth, this proportional bandwidth represents all or part of the total bandwidth BW of the shared resource, and is distributed between each master circuit according to the "profile" of each of them, i.e., here according to their instant need to access the bus.

Thus, an individual proportional bandwidth $PBW_i$ is defined for each master circuit, which is a part of the global proportional bandwidth PBW. This individual proportional bandwidth $PBW_i$ is allocated by means of a proportional access counting value $PCV_i$ specific to each master circuit $M_i$, and a proportional access penalty $PP_i$, also specific to each master circuit $M_i$.

The counting value $PCV_i$ of each master circuit is incremented by a value equal to the penalty $PP_i$ every time the master circuit obtains access to the bus for one access cycle. When several master circuits are simultaneously waiting to access the bus, access is granted to the one having the lowest counting value.

As above, if two master circuits have the same proportional access counting value, the arbitration is performed according to a predetermined arbitration rule, for example by fixed or rotating priority.

Thus, each master circuit $M_i$ has, on average, the possibility of accessing the bus in a proportion defined by its proportional access penalty $PP_i$.

If a master circuit $M_i$ requests a burst access for $B_i$ access cycles, its proportional access counting value $PCV_i$ is, as above, incremented at each access granted, such that the proportional access counting value $PCV_i$ is increased by $B_i$ times the proportional access penalty at the end of the burst access:

$$PCV_i = PCV_i + B_i * PP_i \quad (7)$$

By designating by $PBW_i\%$ the relative proportional bandwidth (percentage reduced to 1) allocated to each master circuit $M_i$ within the total bandwidth BW, it can be shown that:

$$PBW_i\% = \frac{1/PAP_i}{\sum_{i=0}^{i=n} 1/PAP_i} \quad (8)$$

As an example, it will be assumed that the following penalties are allocated to the master circuits M0, M1 M2:

$$PP0=2 \quad (9)$$

$$PP1=3 \quad (10)$$

$$PP2=6 \quad (11)$$

It comes that the relative proportional bandwidths PBW0%, PBW1%, PBW3% allocated to the master circuits M0, M1 M2 are equal to:

$$PBW0\% = 1/2, \text{ i.e., 50\% of the total bandwidth} \quad (12)$$

$$PBW1\% = 1/3, \text{ i.e., 33\% of the total bandwidth} \quad (13)$$

$$PBW2\% = 1/6, \text{ i.e., 16\% of the total bandwidth} \quad (14)$$

Figure 5A:
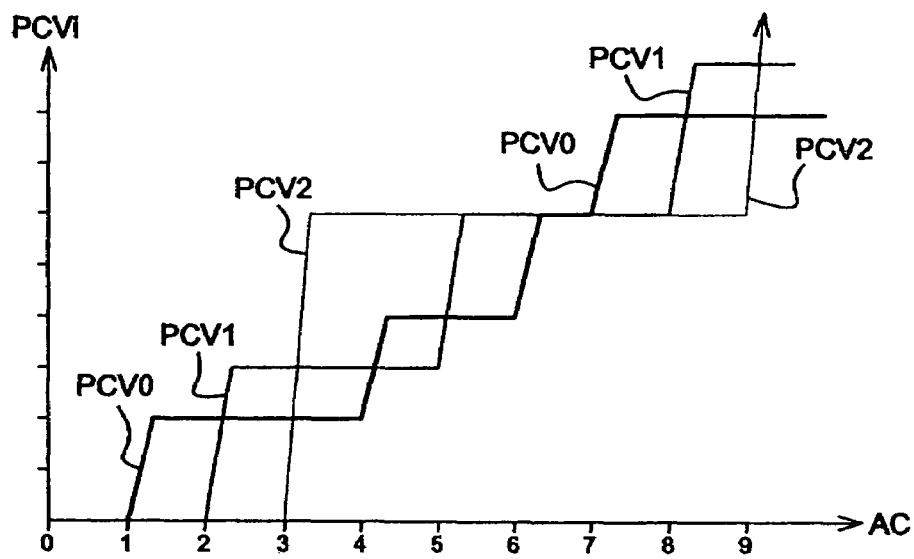
FIGS. 5A to 5E are timing diagrams showing an example of an arbitration sequence according to a second arbitration mechanism according to one embodiment of the present invention.
Figure 5B:
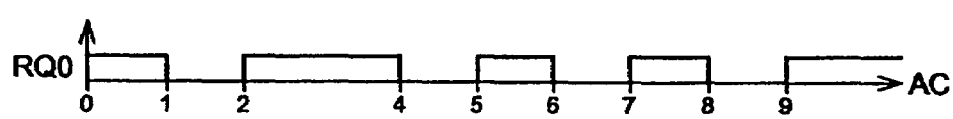
Figure 5C:
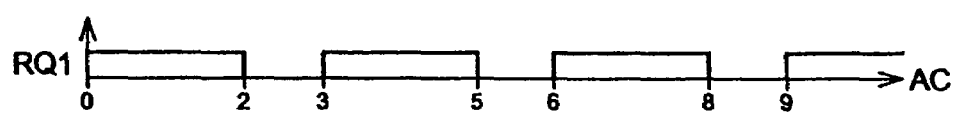
Figure 5D:
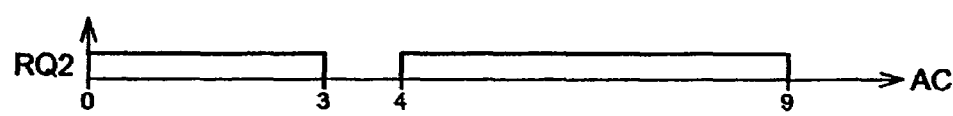
Figure 5E:
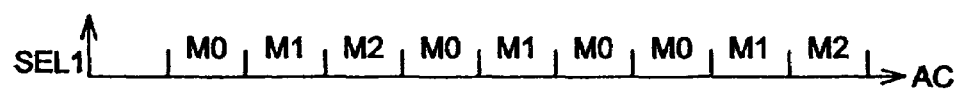

FIGS. 5A to 5E show an example of proportional access arbitration, the horizontal axis of the figures representing access cycles AC. FIG. 5A represents the counting values PCV0, PCV1, PCV2 of the master circuits M0, M1 M2. FIGS. 5B, 5C, 5D respectively represent the access requests RQ0, RQ1, RQ2 supplied by the master circuits. FIG. 5E represents the cycles during which the circuits M0, M1, M2 have access to the bus (signal SEL1).

In accordance with the example described above, the penalty PP0 allocated to the circuit M0 is equal to 2, the penalty PP1 allocated to the circuit M1 is equal to 3 and the penalty PP2 allocated to the circuit M2 is equal to 6. At the beginning of the arbitration, all the counting values are identical and the arbitration is done according to a predetermined rule, here by allocating a priority in inverse proportion to the rank of each master circuit. Thus, access is first of all granted to the circuit M0, then to the circuit M1 etc. The counting values PCV0, PCV1, PCV2 of the circuits M0, M1 M2 are incremented respectively by 2, 3 or 6, at each access granted. It can be seen in FIG. 5E that the circuit M0 has the highest number of accesses since it has a relative proportional bandwidth of 50% (cf. equation 12 above). Conversely, the circuit M2 has the smallest proportional bandwidth and must wait between the cycles 4 and 9 for the circuits M0, M1 to perform several accesses to the bus so that its counting value becomes lower than those of the circuits M0, M1. Furthermore, at the cycle 7, all the counting values are equal and the circuit M2, which has the lowest priority due to its rank i=2 that is higher than the ranks 0 and 1, must wait for the circuits M0, M1 to have had access to the bus before its counting value is the lowest of the three.

As indicated above, the proportional access arbitration mechanism only intervenes in the event of a collision between requests. If one of the master circuits is the only one to request access to the bus, this access is granted to it even if its proportional access counting value is not the lowest. Thus, a proportional access counting value is not taken into account in the comparison of the counting values when the corresponding master circuit has not sent any access request.

The combination of the two arbitration mechanisms will now be described.

Combination of the Two Arbitration Mechanisms

To ensure the coherence of the combination of the two arbitration mechanisms, the minimum access arbitration has priority over the proportional access arbitration. That means that a master circuit having priority in minimum access prevails over a master circuit having priority in proportional access, and that the proportional access arbitration mechanism only intervenes when the minimum access arbitration does not designate any master circuit (particularly when no minimum access counting value has reached the threshold THR). It comes that:

$$BW = MBW + PBW \quad (15)$$

$$PBW = BW - MBW \quad (16)$$

Thus, for example, if 40% of the total bandwidth is reserved as minimum bandwidth, there is 60% of the bandwidth remaining to be distributed as proportional bandwidth. However, this is a simplified evaluation of the effects of the combination, as will become apparent below.

Indeed, again for reasons of coherence of the combination, the proportional access counting value $PCV_i$ of each master circuit is preferably incremented by the proportional access penalty $PP_i$ every time the master circuit obtains access to the bus for one access cycle, whether this access is granted by virtue of the minimum access arbitration mechanism or the proportional access arbitration mechanism. Reciprocally, the minimum access counting value $MCV_i$ of each master circuit is preferably incremented by the minimum access penalty $MP_i$ every time the master circuit obtains access to the bus for one access cycle, whether this access is granted by virtue of the minimum access arbitration mechanism or the proportional access arbitration mechanism.

In these conditions, interactions occur between the two bandwidths, for a same master circuit. Schematically, if a master circuit is allocated a minimum bandwidth higher than its proportional bandwidth, the accesses to the bus will most frequently be granted under the minimum bandwidth and will saturate the proportional access counting value, by causing a sort of deactivation of the proportional access arbitration mechanism for this master circuit. Conversely, if the minimum bandwidth allocated is lower than the proportional bandwidth, the accesses to the bus will most frequently be granted under the proportional bandwidth and will saturate the minimum access counting values, by here causing a sort of deactivation of the minimum access arbitration mechanism. However, as the needs of the master circuits can vary in time, the two mechanisms could also intervene alternately over determined time periods. For example, a master circuit could sometimes access the resource under its minimum access counting value (particularly in a momentarily overloaded system) and sometimes access the resource under its proportional access counting value (when the congestion of the system is reduced).

This will be better understood in the light of the two examples described below, which show two extreme situations in which one of the arbitration mechanisms is deactivated in favour of the other one.

FIGS. 6A, 6B and 7A, 7B represent two arbitration sequences involving the two arbitration mechanisms. In the examples represented, it is assumed that the following data are supplied (specifications):

Frequency of the clock signal CK: 100 MHz,

Number of clock cycles per access cycle: 5

Total bandwidth of the shared resource: 20 MA/s

Decrement applied to the counting values $MCV_i$ at each clock cycle (decrement D): 1

Master circuits sharing the resource: M0, M1 M2

Minimum bandwidth desired for M0: 5 MA/s

Proportional bandwidth desired for M0: 10%

Minimum bandwidth desired for M1: none

Proportional bandwidth desired for M1: 10%

Minimum bandwidth desired for M2: none

Proportional bandwidth desired for M2: 80%

Having regard to these specifications, the following parametering is chosen:

Master circuit M0:

Minimum access penalty: 100/5=20

Proportional access penalty: 8

Master circuit M1

Minimum access penalty: 0

Proportional access penalty: 8

Master circuit M2
  Minimum access penalty: 0
  Proportional access penalty: 1
These data are common to the sequences represented in FIGS. 6A, 6B and 7A, 7B.

Figure 6A:
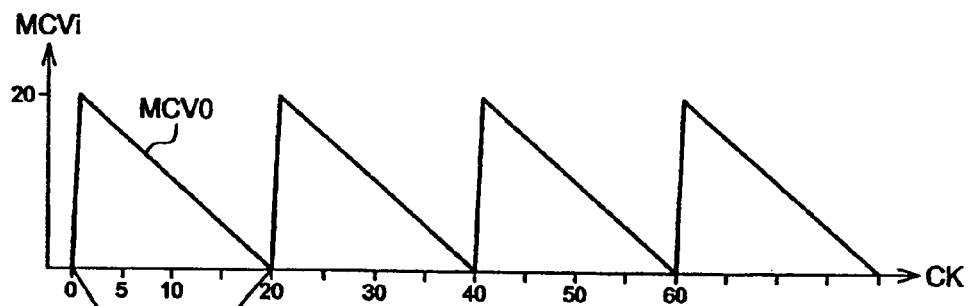
FIGS. 6A and 6B are timing diagrams showing an arbitration sequence according to a combination of the two arbitration mechanisms according to one embodiment of the present invention.
Figure 6B:
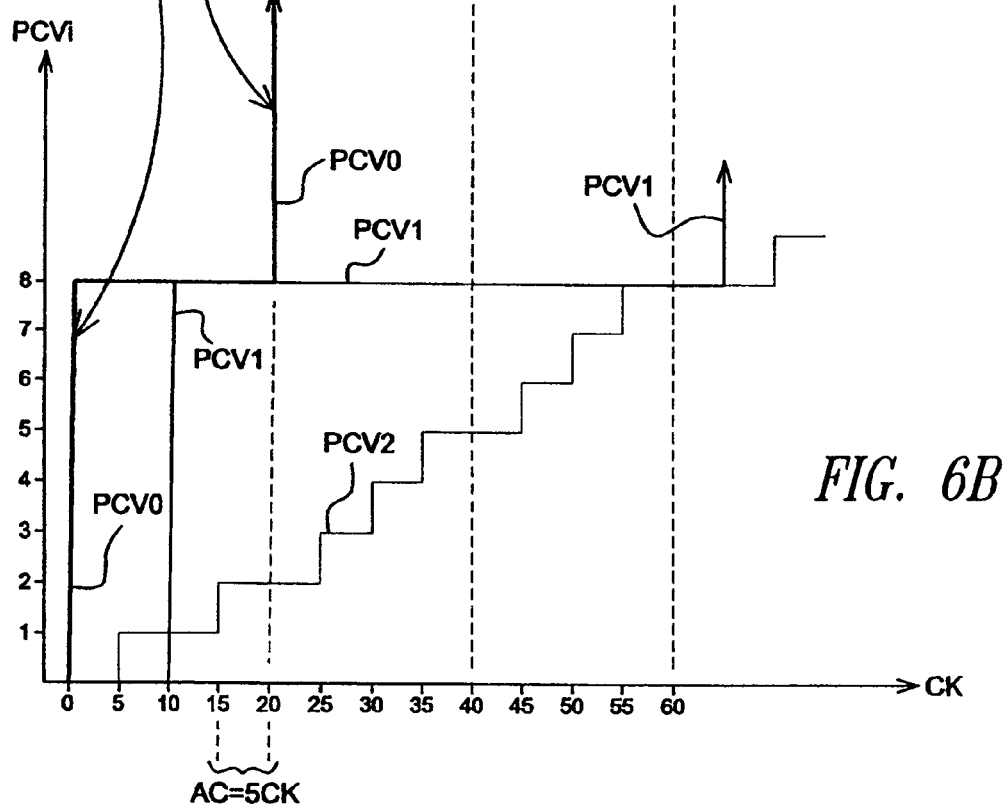

Case No. 1, FIGS. 6A, 6B

It is assumed here that the circuits M0, M1 M2 are active and permanently request access to the bus.

FIG. 6A represents the minimum access counting value MCV0 of the circuit M0, the minimum access counting values of the other circuits being inhibited due to the zero value allocated to their minimum access penalties. FIG. 6B represents the proportional access counting values PCV0, PCV1, PCV2 of the circuits M0, M1 M2. The horizontal axis of the FIGS. 6A, 6B is here graduated in clock cycles CK.

In theory, the circuits M0, M1 M2 obtain 10%, 10% and 80% of the bandwidth under the proportional access arbitration, i.e., respectively 2 MA/s, 2 MA/s, 16 MA/s.

However, the 2 MA/s allocated to the circuit M0 under the proportional access arbitration, are lower than the 5 MA/s allocated under the minimum access arbitration. Thus, the circuit M0 is sufficiently served under the minimum access arbitration (5 MA/s) and its proportional access bandwidth is not used. It can thus be seen in FIG. 6B that the proportional access counting value PCV0 of the circuit M0 rapidly increases since it is incremented every time the access is granted to the circuit M0 by virtue of the minimum access arbitration (i.e., every 20 clock cycles, when the counting value MCV0 reaches the threshold 0, Cf. FIG. 6A). Thus, the circuit M0 never obtains access to the resource under the proportional access arbitration, since its counting value PCV0 remains higher than those of the circuits M1 M2. The bandwidth remaining available for the proportional arbitration is therefore equal to 20−5=15 MA/s, and is shared by the two circuits M1 M2, which respectively receive a bandwidth of 1.66 MA/s ((10%/(10%+80%))*15 MA/s) and of 13.66 MA/s ((80%/(10%+80%))*15 MA/s).

Figure 7A:
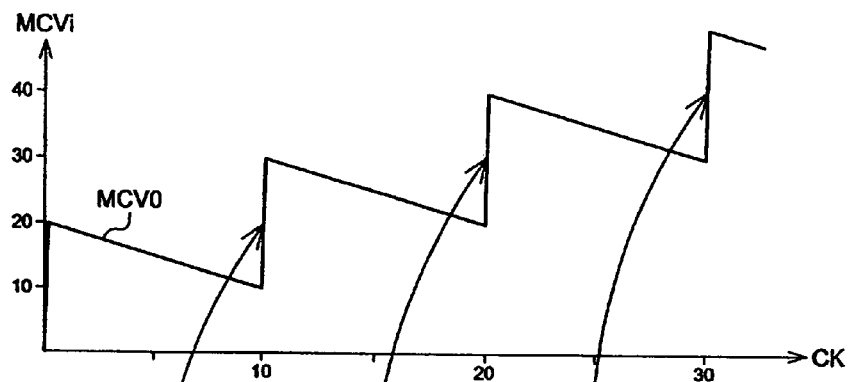
FIGS. 7A and 7B are timing diagrams showing another arbitration sequence according to the combination of the two arbitration mechanisms according to one embodiment of the present invention.
Figure 7B:
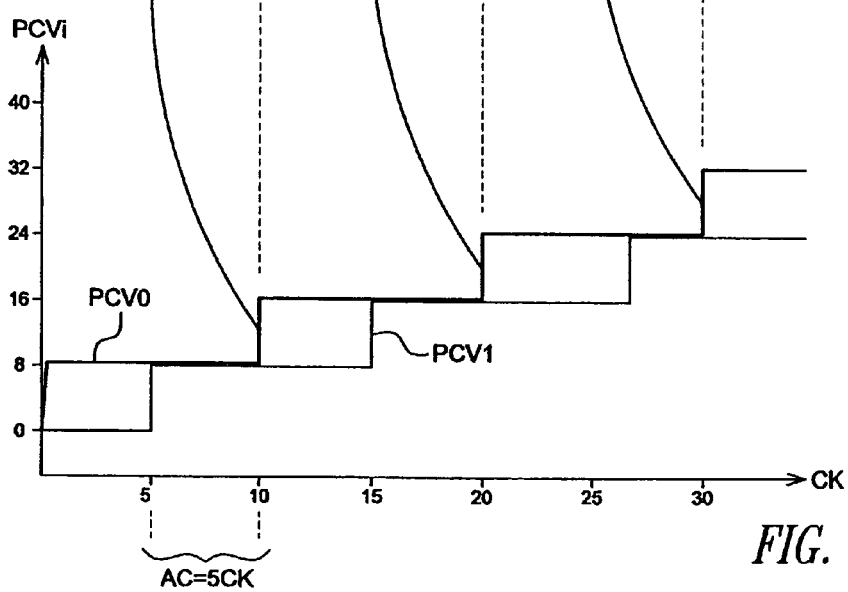

Case No. 2, FIGS. 7A, 7B

It is assumed here that the circuit M2 is stopped, that the circuits M0, M1 are active and permanently request access to the bus.

FIG. 7A represents the minimum access counting value MCV0 of the circuit M0. FIG. 7B represents the proportional access counting values PCV0, PCV1 of the circuits M0, M1. The horizontal axis of the Figures is graduated in clock cycles as above.

As the circuits M0, M1 have the same proportional access penalty, they each receive 50% of the bandwidth, i.e., 10 MA/s each. Now, the 10 MA/s allocated to the circuit M0 under the proportional access arbitration are higher than the 5 MA/s allocated under the minimum access arbitration. Thus, the circuit M0 is sufficiently served under the proportional access arbitration and its minimum access bandwidth is not used. It can therefore be seen in FIG. 7A that the minimum access counting value MCV0 of the circuit M0 rapidly increases at each access granted by virtue of the proportional access arbitration, when in FIG. 7B the counting value PCV0 is lower than that of the circuit M1. Thus, the circuit M0 never obtains access to the resource under the minimum access arbitration, since its counting value MCV0 always remains higher than 0. When the counting values PCV0, PCV1 are equal, priority is arbitrarily granted to the circuit M0.

The combination of the two arbitration mechanisms according to the present invention thus advantageously leads to a dynamic distribution of the bandwidth according to the activity of the elements sharing the common resource.

This can be seen clearly from the table below, which represents the dynamic distribution of the total bandwidth BW between four circuits M1 M2, M3, M4.

In this example, each circuit M1 M2, M3, M4 has a theoretical minimum access bandwidth (without taking the interactions into account) defined below:
  MBW1=10% BW
  MBW2=20% BW
  MBW3=10% BW
  MBW4=10% BW Each circuit M1 M2, M3, M4 also has a theoretical proportional access bandwidth (without taking the interactions into account) defined below:
  PBW1=30% BW
  PBW2=10% BW
  PBW3=5% BW
  PBW4=10% BW The minimum access and proportional access penalties are chosen so that the distribution of the theoretical bandwidth complies with the values indicated above.

Column 1 of the table ("case A") describes the results of the arbitration when the circuits M1 M2, M3, M4 are active and permanently request access to the shared resource. Column 2 of the table ("case B") describes the result of the arbitration when the circuit M1 for example a video camera, is stopped (OFF), while the circuits M2, M3, M4 are active and permanently request access to the shared resource. Column 3 of the table ("case C") describes the result of the arbitration when the circuits M3, M4, for example microprocessors or co-processors, are stopped (OFF), while the circuits M1, M2 are active and permanently request access to the shared resource.

The distribution of the individual bandwidths varies dynamically to occupy all the bandwidth of the shared resource, according to the predominance of one mechanism over the other. The results given in the table are only given as a guide and have been determined by an iterative calculation enabling the degrees of predominance in each case to be estimated.

|          | Theoretical % | Case A | Case B    | Case C    |
|----------|---------------|--------|-----------|-----------|
| MBW1     | 10% BW        | 0%     | 0% (OFF)  | 0%        |
| MBW2     | 20% BW        | 20%    | 0%        | 0%        |
| MBW3     | 10% BW        | 10%    | 0%        | 0% (OFF)  |
| MBW4     | 10% BW        | 0%     | 0%        | 0% (OFF)  |
| PBW1     | 30% BW        | 52.5%  | 0% (OFF)  | 75%       |
| PBW2     | 10% BW        | 0%     | 40%       | 25%       |
| PBW3     | 5% BW         | 0%     | 20%       | 0% (OFF)  |
| PBW4     | 10% BW        | 17.5%  | 40%       | 0% (OFF)  |
| Total M1 | —             | 52.5%  | 0% (OFF)  | 75%       |
| Total M2 | —             | 20%    | 40%       | 25%       |
| Total M3 | —             | 10%    | 20%       | 0% (OFF)  |
| Total M4 | —             | 17.5%  | 40%       | 0% (OFF)  |

Example of an Embodiment of the Arbitration Circuit ACT2

Figure 8A:
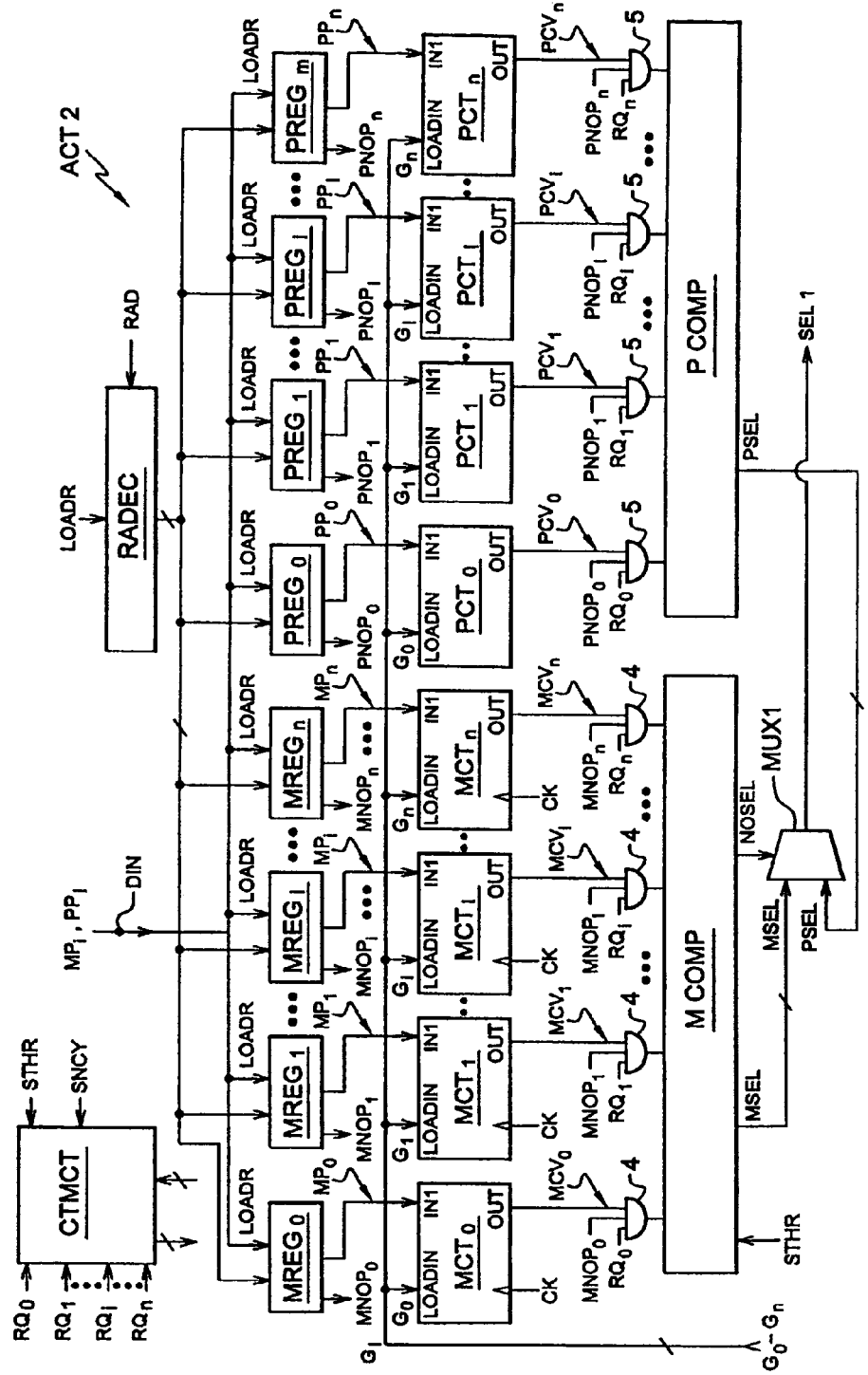
FIGS. 8A, 8B, 8C represent an example of an embodiment of the arbitration circuit represented in block form in FIG. 2.

FIG. 8A represents an example of an embodiment of the arbitration circuit ACT2.

The circuit ACT2 comprises registers MREGi (MREG0, MREG1, ... MREGn) for saving penalties MPi of the minimum access arbitration mode MPi, and registers PREGi (PREG0, PREG1, ... PREGn) for saving the penalties PPi of the proportional access arbitration mode. Each register MREGi, PREGi is linked to an input DIN of the circuit ACT2, to which the penalties MPi, PPi to be loaded into the registers are applied. The selection of each register for loading a penalty is performed by an address decoding circuit RADEC. The latter receives at a first input an address RAD designating the register to be selected and at a second input a load signal LOADR, and applies the signal LOADR to the register designated by the address RAD.

The circuit ACT2 also comprises counters MCTi (MCT0, MCT1 . . . MCTn) containing the minimum access counting values MCVi, and counters PCTi (PCT0, PCT1 . . . PCTn) containing the proportional access counting values PCVi.

Each counter MCTi comprises an adder input IN1, a load input LOADIN, and an output OUT. The adder input IN1 is linked to the output of a register MREGi of corresponding rank, to receive the corresponding minimum access penalty MPi. The input LOADIN receives a control signal Gi of corresponding rank, supplied by the multiplexer circuit BMUX, Cf. FIG. 2.

Similarly, each counter PCTi comprises an adder input IN1, a load input LOADIN, and an output OUT. The adder input IN1 is linked to the output of a register PREGi of corresponding rank, for receiving the corresponding proportional access penalty PPi. The input LOADIN receives a control signal Gi of corresponding rank.

Thus, when a control signal Gi changes to 1 (which means that the corresponding master circuit Mi has had access to the bus BSH) the minimum access counter MCTi of corresponding rank loads the minimum access penalty MPi and adds it to the current value of its counting value MCVi. Simultaneously, the proportional access counter PCTi of corresponding rank loads the proportional access penalty PPi and adds it to the current value of its counting value PCVi.

The counters MCTi further comprise a synchronization input receiving the clock signal CK, and are arranged for decrementing the minimum access counting values MCVi by 1 (D=1), at each cycle of the clock signal CK.

The minimum access counting values MCVi supplied by the counters MCTi are applied to inputs of a comparison circuit MCOMP, through AND gates 4. Each AND gate receives at a second input the request signal RQi sent by the master circuit Mi of corresponding rank, and at a third input a signal MNOPi (MNOP0, MNOP1, . . . MNOPn) supplied by the register MREGi of corresponding rank. When a master circuit Mi does not send any access request and maintains the signal RQi on 0, the corresponding AND gate is not on and the counting value MCVi is not applied to the comparison circuit MCOMP. Similarly, when a register MREGi receives a penalty MPi of zero value, the corresponding signal MNOPi changes to 0, the corresponding AND gate is not on and the counting value MCVi is not applied to the comparison circuit MCOMP.

Similarly, the proportional access counting values PCVi supplied by the counters PCTi are applied to inputs of a comparison circuit PCOMP, through AND gates 5. Each AND gate receives at a second input the request signal RQi sent by the master circuit Mi of corresponding rank, and at a third input a signal PNOPi (PNOP0, PNOP1, . . . PNOPn) supplied by the register PREGi of corresponding rank. When a master circuit Mi does not send any access request and maintains the signal RQi on 0, the corresponding AND gate is not on and the counting value PCVi is not applied to the comparison circuit PCOMP. Similarly, when a register PREGi receives a penalty PPi of zero value, the corresponding signal PNOPi changes to 0, the corresponding AND gate is not on and the counting value PCVi is not applied to the comparison circuit PCOMP.

The circuit MCOMP supplies a minimum access selection signal MSEL and a signal NOSEL of non-selection, and receives at an auxiliary input a binary-coded signal STHR the value of which represents the high-priority threshold THR described above. In accordance with the minimum access arbitration algorithm according to the present invention, the signal MSEL designates the rank of the input of the circuit MCOMP to which a counting value MCVi is applied that is lower than the threshold THR and that is the lowest of all the counting values received by the other inputs of the circuit MCOMP. As the rank of the input designated by the signal MSEL is the rank of the corresponding master circuit Mi, the signal MSEL designates the master circuit to be selected under the minimum access. As indicated above, the counting values MCVi that are inhibited by the AND gates in the absence of access requests (RQi=0), are not taken into account in this selection. Furthermore, if no counting value MCVi is lower than the threshold THR, the signal MSEL is taken to a predetermined value and the signal NOSEL is set to 1.

The circuit PCOMP supplies a proportional access selection signal PSEL. In accordance with the proportional access arbitration algorithm according to the present invention, the signal PSEL designates the rank of the input of the circuit PCOMP at which the counting value PCVi that is higher than the other counting values received by the other inputs of the circuit PCOMP is found. As the rank of the input designated by the signal PSEL is the rank of the corresponding master circuit Mi, the signal PSEL designates the master circuit to be selected under the proportional access. The counting values PCVi, inhibited by the AND gates in the absence of access requests (RQi=0), are not taken into account in this selection.

The signals MSEL, PSEL are applied to two inputs of a multiplexer MUX1 the output of which supplies the selection signal SEL1. The multiplexer MUX1 receives the signal NOSEL at a control input, and supplies at output the signal MSEL when NOSEL is on 0, or the signal PSEL when the signal NOSEL is on 1. Thus, the signal SEL1 is equal to the minimum access arbitration signal MSEL when a master circuit can be designated under the minimum access arbitration (NOSEL=0), otherwise it is equal to the proportional access arbitration signal PSEL (NOSEL=1).

The choice of the size of the counters depends on the maximum penalty that it is desired to be able to allocate to the master circuits, and on the maximum number of burst accesses possible. If a precision of 3% is sought in the distribution of the minimum bandwidth and of the proportional bandwidth, the minimum and proportional access penalties must extend from 0 to 31 by steps of 1 (i.e., 0, 1, 2 . . . 31). In this case, if the maximum number of burst accesses is 16, the counters must be able to accept counting values ranging up to 16*32 i.e., 512 in positive value. Given that the minimum access counters MCTi must also be able to count negative values, 10-bit counters with 2's complement are chosen, that can count up to −512 and +511. As the proportional access counters do not receive any negative value, 10-bit counters without 2's complement can be chosen, that can count from 0 to 1023, or even counters of higher range if it is desired to be able to program considerable gaps between the proportional access penalties.

The arbitration circuit ACT2 also comprises a circuit CTMCT for managing the counters MCTi and PCTi.

Figure 8B:
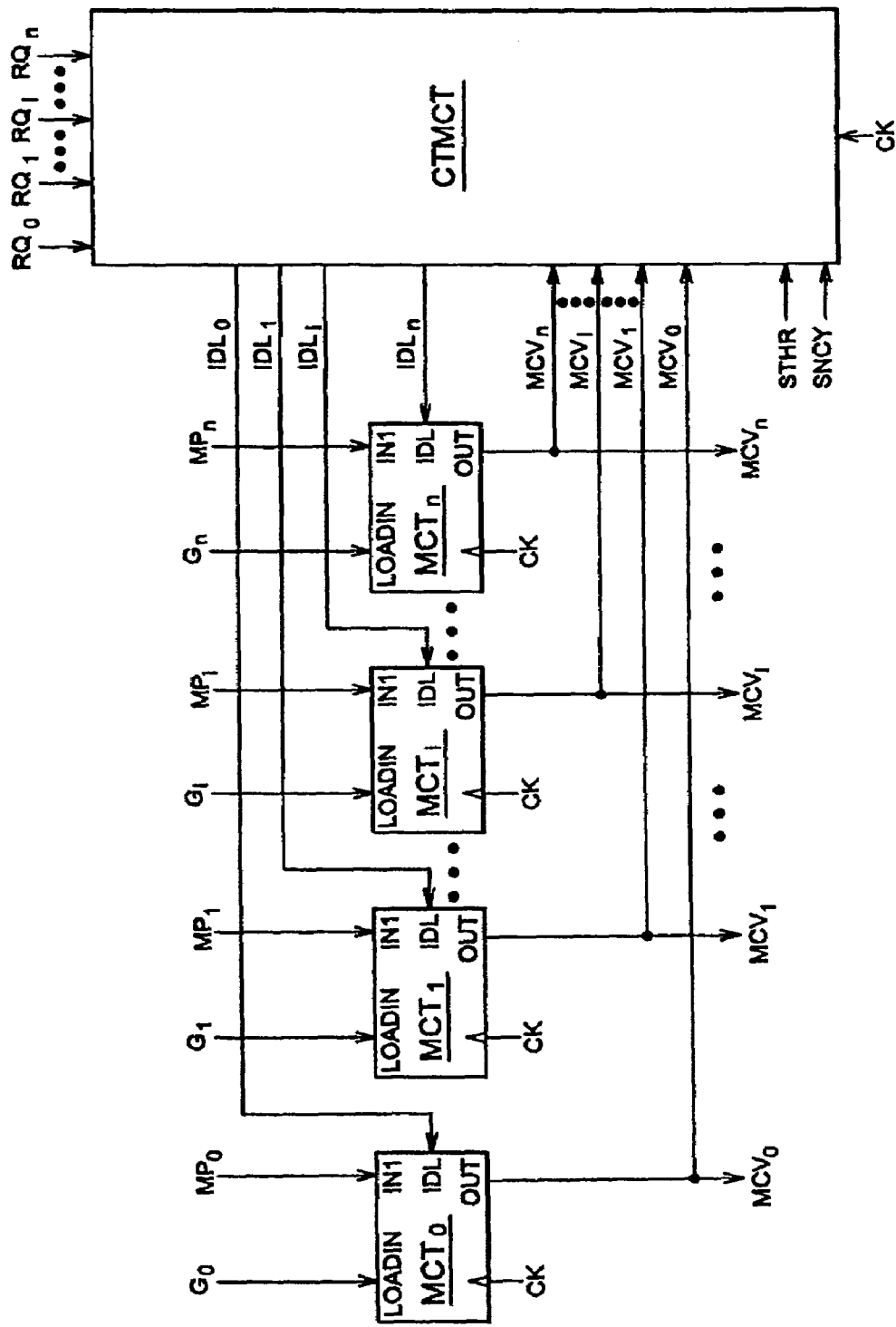

The electrical links between the management circuit CTMCT and the counters MCTi are represented in FIG. 8B. Each minimum access counter MCTi comprises, in addition to the inputs already described, an input IDL enabling it to be put into a state for inhibiting the counting value MCVi.

The circuit CTMCT monitors the request signals RQi sent by the master circuits, as well as the outputs of the counters MCTi, and receives at auxiliary inputs a binary-coded signal SNCY representing a threshold NCY, as well as the binary-coded signal STHR representing the high-priority threshold THR. The circuit CTMCT counts the number of clock cycles between each request, and compares it with the threshold NCY. When a request signal RQi has not changed to 1 for a number of clock cycles higher than or equal to NCY, the circuit CTMCT then monitors the output of the corresponding counter MCTi and waits for the counting value MCVi to be equal to the threshold THR. When the counting value reaches the threshold THR, the circuit CTMCT applies an inhibiting signal IDLi to the input IDL of the corresponding counter MCTi. The counting value is thus blocked at the threshold THR, until the master circuit concerned sends access requests again.

Figure 8C:
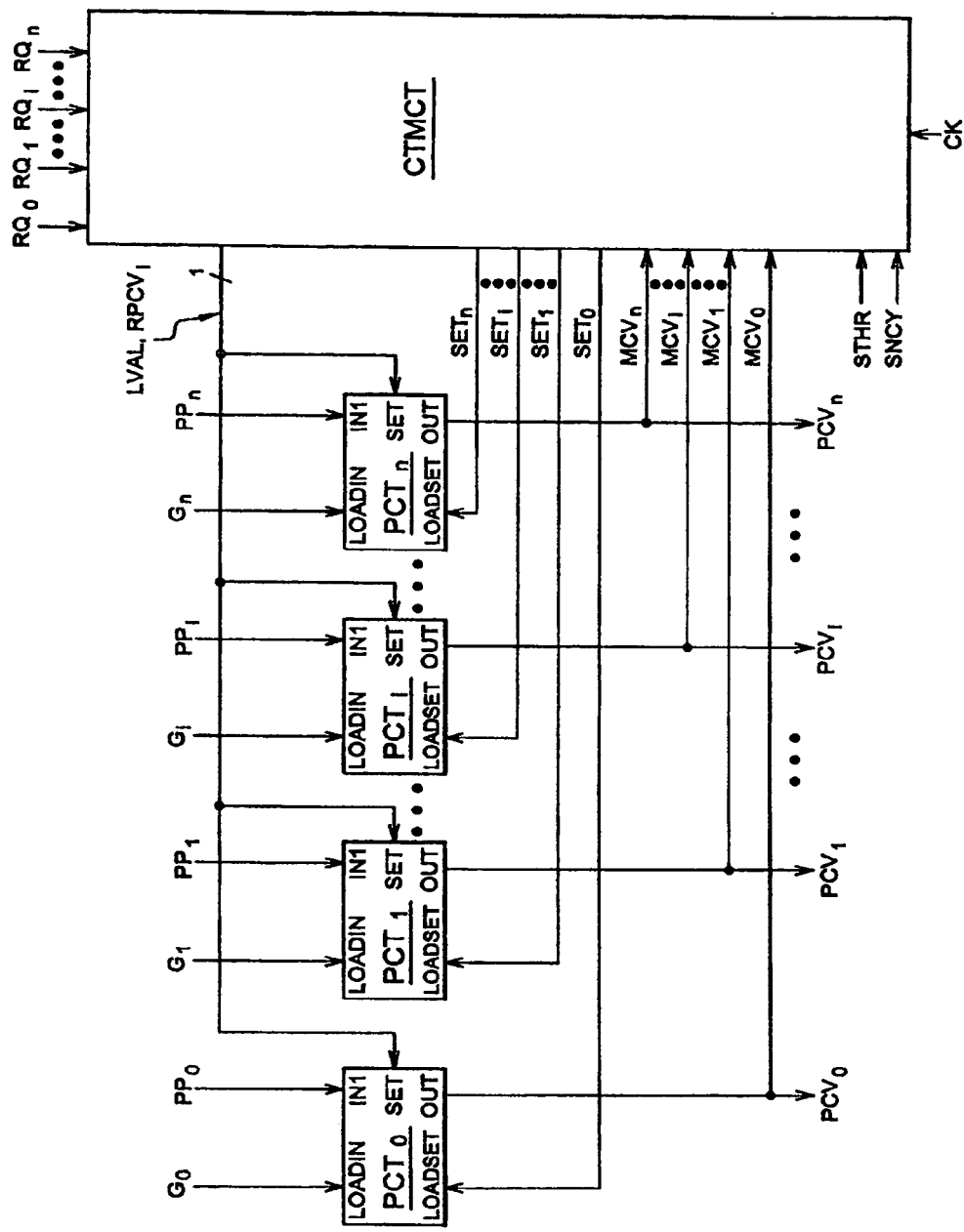

The electrical links between the management circuit CTMCT and the proportional access counters PCTi are represented in FIG. 8C. In addition to the inputs already described, each counter PCTi comprises a non-adder input SET and an input LOADSET. The input SET allows a counting value, determined by overwriting the current counting value, to be loaded into the counter. For that purpose, a load signal SETi must be applied to the input LOADSET of the counter.

The circuit CTMCT monitors the request signals RQi sent by the master circuits, as well as the outputs of the counters PCTi. The circuit CTMCT counts the number of clock cycles between each request, and compares it with the threshold NCY described above. When a request signal RQi has not changed to 1 for a number of clock cycles higher than or equal to NCY, the circuit CTMCT reads the outputs of all the counters PCTi and searches for the lowest counting value PCVi, that will be designated LVAL. The circuit CTMCT then loads this lowest counting value into the counter PCTi of the master circuit that no longer sends any access request, by applying the value LVAL to the input SET of the counter and by applying a load signal SETi to the input LOADSET of the counter.

Thus, when a master circuit no longer sends any access request for a determined period of time, its counting value PCVi is taken to a value equal to the lowest counting value of the master circuits still active. This avoids a master circuit that has been inactive for a certain time finding itself with a very low counting value relative to the other master circuits, and having the entire proportional bandwidth when it becomes active again.

The circuit CTMCT also manages the counter range of the counters PCTi. Indeed, the proportional access counting values are constantly incremented with the proportional access penalties and are never decremented. To avoid the saturation of the counters, the counting values are reduced by a value equal to the half counter range HCR, for example 512, when they are all in the highest half counter range of the counter, for example between 512 and 1024. In this case, the circuit CTMCT calculates a reduced counting value RPCVi for each counting value PCVi, such that:

$$RPCVi = PCVi - HCR \quad (17)$$

and loads this reduced counting value RPCVi into the corresponding counter PCTi, through the input SET of the counter, by applying the signal SETi to the input LOADSET of the counter.

It will be understood by those skilled in the art that various alternatives and embodiments of the present invention may be made.

In particular, although the description above was of a mode for managing the counting values according to which the counting values MCVi are decremented at the pace of the clock signal and are incremented by the minimum access penalties, a reverse mechanism can be provided. In this case, the counting values MCVi are incremented at the pace of the clock signal and are decremented by the minimum access penalties. In this case, the high-priority threshold is not a lower threshold but a higher threshold to be reached to benefit from the access to the common resource. Similarly, the counting values PCVi can be decremented by the proportional access penalties instead of being incremented. In this case, the master circuit that has priority under the proportional access is the one having the highest counting value.

Also, instead of allocating different penalties MPi to the master circuits and decrementing the counting values MCVi by the same decrement D at each clock cycle, an alternative embodiment comprises the fact of allocating identical penalties and allocating variable decrements "Di" (D0, D1, . . . Dn), which results in the same technical effect since it is the ratio between the value of a penalty and the decrement that determines the number of clock cycles between two access authorizations under the minimum access (i.e., the time base allocated to each master circuit).

Generally speaking, the two arbitration mechanisms according to some embodiments of the present invention are independent from one another and can each be implemented independently from the other one or in combination. Thus, above it was indicated that the arbitration can be entirely managed by the minimum access mechanism. It is also possible to put a classical arbitration method (fixed priority, Round Robin . . . ) in charge of the bandwidth left free by the minimum access arbitration. In particular, this can be the default arbitration method provided in the standard circuit BMUX described above.

As proposed above, the combination of the two arbitration mechanisms is preferably interactive, which means that the two counting values of a same master circuit are incremented at each access to the shared resource, whether this access is granted by virtue of the minimum access arbitration or the proportional access arbitration. This results in arbitration scenarios of the type represented in FIGS. 6A, 6B, 7A, 7B. However, the combination of the two arbitration mechanisms can also be implemented without interactivity between the arbitration mechanisms, while leaving the priority to the minimum access arbitration.

Finally, various other applications of the arbitration method according to the present invention may be made. Generally speaking, the methods according to some embodiments of the present invention can be implemented in various forms and the method can be applied to various elements. The means for accessing the shared resource can also take various shapes other than that of a multiplexer circuit. For example, it can be an authorization signal generator which, using the current value of the selection signal SEL, authorizes a given element to use the resource and forbids the others to use the resource.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for arbitrating access to a resource shared by plural electronic elements and accessible according to access cycles clocked by a clock signal, the method comprising:
   allocating each element a first counting value and a first penalty;
   modifying, in a first numerical direction, the first counting value of each element, in synchronization with the clock signal;
   modifying, in a second numerical direction opposite to the first numerical direction, the first counting value of each element, by a value equal to the first penalty, every time the element is selected for an access cycle; and
   when the plural electronic elements are simultaneously waiting to access the shared resource, selecting one of the plural electronic elements to access the resource if its first counting value reaches a threshold, and if its first counting value exceeds in the first numerical direction, the first counting values of the other elements that are simultaneously waiting to access the shared resource, wherein:
   each element is allocated a second counting value and a second penalty;
   the second counting value of each element is modified in the second numerical direction, by a value equal to the second penalty, every time the element is selected;
   when several elements are simultaneously waiting to access the shared resource, if no element can be selected by virtue of its first counting value, the element selected is the one the second counting value of which exceeds in the first numerical direction the second counting values of the other elements having sent an access request; and
   the first counting value of each element is modified in the second numerical direction, by a value equal to the first penalty, every time the element is selected by virtue of its second counting value, and reciprocally the second counting value of each element is also modified in the second numerical direction, by a value equal to the second penalty, every time the element is selected by virtue of its first counting value.

2. The method according to claim 1 wherein an element is selected whatever its first counting value, if it is the only element requesting access to the shared resource.

3. The method according to claim 1 wherein, when two elements likely to be selected have the same first counting value, the element to be selected is designated by applying a predetermined selection rule.

4. The method according to claim 1 wherein the access requests may concern several successive access cycles and, when an element having sent an access request concerning several access cycles is selected, access to the shared resource is granted to the element for the number of access cycles requested, even if, after the first access cycle of the element, the element can no longer be selected by virtue of its first counting value.

5. The method according to claim 4 wherein the first counting value of an element is inhibited when the element does not send an access request for a determined number of access cycles.

6. The method according to claim 1 wherein the second counting value of an element is maintained at a determined value when the element does not send an access request for a determined number of access cycles.

7. The method according to claim 6 wherein the second counting value of an element that has not sent any access request for a determined number of access cycles, is maintained at the determined value equal to the lowest second counting value of the elements sending access requests.

8. The method according to claim 1, wherein the access requests may concern several successive access cycles and, when an element having sent an access request concerning several access cycles is selected, access to the shared resource is granted to the element for the number of access cycles requested, even if, after the first access cycle of the element, the element can no longer be selected by virtue of its first and second counting values.

9. The method according to claim 1, applied to a device wherein the shared resource is a data bus linked to one or several peripheral circuits through an access multiplexer circuit, the electronic elements being master circuits relative to the peripheral circuits.

10. The method according to claim 9 wherein the access multiplexer circuit supplies control signals designating the master circuit selected at each access cycle, and wherein the control signals are used to identify which of the counting values is modified at each access to the data bus.

11. A device for arbitrating access to a resource shared by plural electronic elements, the shared resource being accessible according to access cycles clocked by a clock signal, the device comprising:
   first storage elements for storing, for each element, a first penalty individually allocated to each element;
   first counters for individually allocating to each element a first counting value, and for modifying, in a first numerical direction, the first counting value in synchronization with the clock signal, and modifying, in a second numerical direction opposite to the first numerical direction, the first counting value by a value equal to the first penalty, every time the corresponding element is selected for an access cycle;
   a first comparison circuit for supplying, when the plural electronic elements are simultaneously waiting to access the shared resource, a first selection signal designating an element the first counting value of which reaches a threshold, and the first counting value of which exceeds in the first numerical direction the first counting values of the other elements having sent an access request;
   second storage elements for storing, for each element, a second penalty individually allocated to each element;
   second counters for individually allocating to each element a second counting value, and modifying in the second numerical direction, the second counting value by a value equal to the second penalty, every time the corresponding is selected for an access cycle; and
   a second comparison circuit for supplying, when the plural electronic elements are simultaneously waiting to access the shared resource, a second selection signal designating an element the second counting value of which exceeds in the first numerical direction the second counting values of the other elements having sent an access request, wherein the first counting value of each element is modified in the second numerical direction, by a value equal to the first penalty, every time the element is selected by virtue of its second counting value, and reciprocally the second counting value of each element is modified in the second numerical direction, by a value equal to the second penalty every time the element is selected by virtue of its first counting value.

12. The device according to claim 11, further comprising: means for selecting an element that is the only element requesting access to the shared resource, whatever the first counting value of the element is.

13. The device according to claim 11 wherein, when two elements have the same first counting value, the first comparison circuit is arranged for selecting one of these elements according to a predetermined selection rule.

14. The device according to claim 11, further comprising a circuit for managing the first counters to inhibit the first counting value of an element that has not sent an access request for a determined number of access cycles.

15. The device according to claim 11, further comprising a multiplexer circuit structured to output a general selection signal equal to the second selection signal when the first comparison circuit does not find an element to select, otherwise being equal to the first selection signal.

16. The device according to claim 11, further comprising a circuit for managing the second counters to maintain the second counting value of an element at a determined value when the element does not send an access request for a determined number of access cycles.

17. The device according to claim 16 wherein the circuit for managing the second counters maintains the second counting value of an element that has not sent any access request for a determined number of access cycles, at a value equal to the lowest second counting value of the elements sending access requests.

18. The device according to claim 11, further comprising a circuit for managing access requests in bursts that is arranged for maintaining the selection of a selected element, even if, after the first access cycle granted to the element, this element cannot be selected by virtue of its first or second counting value.

19. The device according to claim 11, further comprising an access multiplexer circuit for linking a selected element to the shared resource at each access cycle.

20. The device according to claim 19 wherein the access multiplexer circuit supplies control signals designating the master circuit selected at each access cycle, the control signals being applied to the counters as load signals, for loading the first or the second penalty.

21. The device according to claim 11 wherein the shared resource is a bus linked to one or several peripheral circuits, the electronic elements being master circuits relative to the peripheral circuits.

22. A method for arbitrating access to a resource shared by plural electronic elements and accessible according to access cycles clocked by a clock signal, the method comprising:
    allocating to the elements respectively first counting values and respectively first penalty values;
    modifying, in a first numerical direction, the first counting values in synchronization with the clock signal;
    selecting one of the elements;
    modifying, in a second numerical direction opposite to the first numerical direction, the first counting value of the selected element by the first penalty value of the selected element in response to the selecting step;
    when plural of the elements are waiting to be selected:
    determining whether any of the waiting elements has a first counting value that has attained a minimum access threshold;
    if there is only one of the waiting elements that has a first counting value that has attained the minimum access threshold, then selecting the one element;
    if there are plural of the waiting elements having first count values that have attained the minimum access threshold, then selecting one of the waiting elements based on a comparison of the first counting values of the waiting elements with each other;
    allocating to the elements a second counting value and a second penalty value;
    modified in the second numerical direction the second counting value of each element by the second penalty value of the element in synchronization with the clock signal, each time the element is selected; and
    when plural elements are simultaneous waiting for the shared resource:
    granting access to the element with the second counting value which exceeds in the first numerical direction the second counting values of the other elements that are waiting, if no element can be selected by virtue of its first counting value; wherein the first counting value of each element is incremented by a value equal to the first penalty, every time the element is selected by virtue of its second counting value and the first counting value is decremented in synchronization with each cycle of the clock; and the second counting value of each element is incremented by a value equal to the second penalty, every time the element is selected by virtue of its first counting value and the second counting value is decremented each time the element is selected by virtue of its first counting value.

23. The method according to claim 22 wherein, when two waiting elements have the same first counting value, then selecting one of the two waiting element having the same first counting value by applying a predetermined selection rule.

24. The method according to claim 22 wherein the first counting value of an element is inhibited when the element does not send an access request for a determined number of access cycles.

25. The method according to claim 22 wherein the second counting value of an element is maintained at a determined value when the element does not send an access request for a determined number of access cycles.

26. The method according to claim 25 wherein the second counting value of an element that has not sent any access request for a determined number of access cycles, is maintained at the determined value equal to the lowest second counting value of the elements sending access requests.

27. The method according to claim 22, wherein the access requests may request a plural number of successive access cycles and, when an element having requested a plural number of successive access cycles is selected, access to the shared resource is granted to the element for the number of access cycles requested, even if, after the first access cycle of the element, the element can no longer be selected by virtue of its first and second counting values.

* * * * *

UNITED STATES PATENT AND TRADEMARK OFFICE
CERTIFICATE OF CORRECTION

| | |
|---|---|
| PATENT NO. | : 7,404,024 B2 |
| APPLICATION NO. | : 10/966623 |
| DATED | : July 22, 2008 |
| INVENTOR(S) | : Gilles Ries et al. |

It is certified that error appears in the above-identified patent and that said Letters Patent is hereby corrected as shown below:

Column 20
Lines 47-48, "every time the corresponding is selected for an access cycle; and" should read as -- every time the corresponding element is selected for an access cycle; and --

Signed and Sealed this

Twenty-first Day of October, 2008

JON W. DUDAS
*Director of the United States Patent and Trademark Office*